3,133,890
WATER RESISTANT STARCH ADHESIVE
Richard K. Britton, Sidney, N.Y., assignor to The Borden Company, a corporation of New Jersey
No Drawing. Filed Sept. 26, 1958, Ser. No. 763,466
1 Claim. (Cl. 260—17.4)

This invention relates to an adhesive composition containing starch and suitably also polyvinyl alcohol.

Starch and polyvinyl alcohol adhesives have been described heretofore and it has been said that such adhesives, when used in fiberboard laminations, for instance, require modification to overcome the normally low water resistance. One such modification is the incorporation of 50% to 70% of a special kind of clay on the weight of the whole composition. In the use of this required large proportion of clay there is necessarily an increase in the packaging and transportation costs of the adhesive when shipped in ready to use, mixed form. There is also increased thickness of adhesive film required, less coverage therefore per unit of the adhesive composition, abrasive action of the adhesive on the applying machinery, and, I find, imperfect resistance to water.

The present invention provides an adhesive that when used in laminating piles of paper or the like is satisfactorily resistant to water, has high coverage power, and is effective as a thin, smooth film in the adhesive joint.

Briefly stated, the invention comprises the adhesive reaction product of heating starch dispersed in water at a gelatinization temperature therefor and in contact with the copolymer of polyvinyl methyl ether and maleic anhydride; compositions thereof including to advantage polyvinyl alcohol; and the herein described process of reacting the said copolymer with the starch.

With such adhesive compositions, I effect adhesion between sheets of high wet strength paper, for example that, after 24 hours immersion in water, is stronger in the adhesive joint than of the papers themselves.

Once the results have been obtained, various theories may be advanced to explain the mechanism of the reaction of the starch with the copolymer of vinyl methyl ether, of the formula $CH_3—O—CH=CH_2$ as a monomer, and maleic anhydride

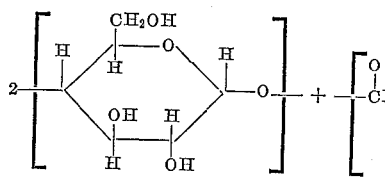

I consider that the dispersed starch in gelatinized condition provides accessibility of the starch in sufficiently small units of proper reaction with the copolymer which, as used, still retains the anhydride group. The result is satisfactorily uniformly distributed esterification of the exposed surface of the starch by the copolymer which, in a representative proportion, provides only a fraction of the anhydride groups that would be required to esterify all the hydroxyl groups of the starch.

Writing the polymer in its simplest form, showing the addition of 1 vinyl methyl ether to 1 maleic anhydride group, and using starch as a source of OH group, the cross-linking reaction may be represented by the following mechanism:

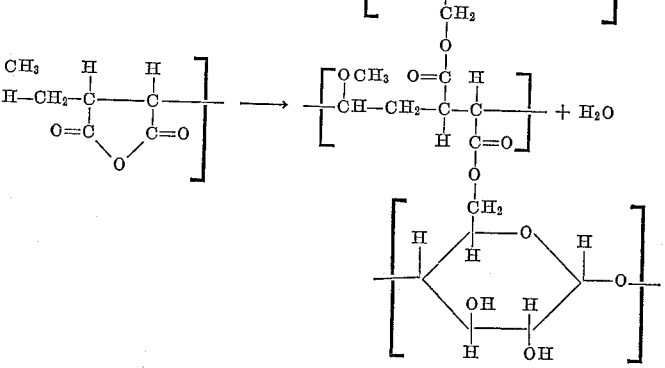

It is immaterial to the invention whether the ether group $OCH_3$ is attached, in the copolymer PVM/MA and in the finished product, to the first or second carbon of the original vinyl group or in part to each.

As to materials, the starch is any commercial grade such as corn, potato, rice, wheat, waxy maize, or tapioca starch. Cornstarch is satisfactory, is economically desirable because of its price, and is the starch that I ordinarily use. Partially converted starches may also be used in order to build up higher solids content but water resistance will then be lowered.

The polyvinyl methyl ether and maleic anhydride copolymer (PVM/MA) is any of the commercially available materials of that name. I have used to advantage such copolymer in which the molar ratios of polyvinyl methyl ether and maleic anhydride represented are approximately 1:1 and the specific viscosity is in the range 0.1–3.5. I obtain the best water resistance, for a given proportion of the copolymer used, when its specific viscosity is high, as within the range 1–3.5 and suitably at least 2. Viscosities higher than 3.5 are not currently available.

Polyvinyl alcohol, used to increase the fluidity of the composition and acts as a film-forming component, is any commercial polyvinyl alcohol as, for example, one that results from nearly complete hydrolysis of polyvinyl acetate, any remaining large proportion of the acetate decreasing the water resistance of the finished adhesive film. High viscosity of the polyvinyl alcohol is helpful in increasing the water resistance and giving a maximum film-forming effect for a given proportion of the alcohol used. For this reason I use a polyvinyl alcohol ranging in viscosity, for a 4% aqueous solution, approximately from 30 up, as from 30–100 cps. at 20° C.

Ranges of proportions that are permissible and also those that give best results under commercial conditions are shown in the following table.

| Component | Parts by Weight for 100 Dry Weight of Composition | |
|---|---|---|
| | Permissible | Commercial |
| Starch | 15–95 | 30–75 |
| PVM/MA | 2–20 | 4–20 |
| Polyvinyl alcohol | 0–75 | 15–60 |

Proportions of the PVM/MA copolymer above those shown may be used but are unnecessary and uneconomical.

Water is incorporated to give the concentration and consistency desired in the adhesive as used. A suitable proportion is 900 parts of the water to 100 dry weight of the other components although the proportion of water may be varied within limits, as from 400–2500 parts for 100 dry weight of the adhesive composition, the exact proportion to be used varying mostly with the viscosity after pasting of the kind of starch selected.

A starch preservative is introduced of kind and in proportion that is conventional for preventing bacterial action on starch. Thus I use sodium orthophenyl phenate, phenol, benzoic acid, or sodium ethyl hydroxy benzoate in the proportion of 0.5% or so on the weight of the starch.

As to conditions of manufacture, the components described are mixed with water and the mixture raised in temperature promptly to the pasting point of starch, before the copolymer is completely dissolved and reacted. The pasting point is about 125° F. and up for the various kinds of starch, being about 160°–165° for unconverted cornstarch. I heat usually to about 190°. The elevated temperature is maintained until the reaction is completed as shown by the mass reaching the thickened stage and the viscosity ceasing to rise substantially. I then discontinue the heating. The product increases very slowly in viscosity until it eventually gels. This is evidence of the cross-linking action of PVM/MA, since a similar mixture with this copolymer omitted will gradually thin out after the first rapid thickening which takes place when the starch gelatinizes.

The adhesive paste so made may be used directly as within a week or so of the time of the heating before gelling occurs.

The invention will be further illustrated by detailed description in connection with the following specific examples of the practice of it, proportions here and elsewhere herein being expressed as parts by weight unless specifically stated to the contrary.

EXAMPLE 1

The polyvinyl alcohol here used contained about 98% actual polyvinyl alcohol and 2% polyvinyl acetate, experience having shown this polyvinyl acetate content of the commercial alcohol not to appreciably modify the properties of the final adhesive. Also the polyvinyl alcohol used had a viscosity of 65 cps. when tested in 4% solution at 20° C.

A mixture was made of the following materials.

Cornstarch 60 parts, the polyvinyl alcohol 34.5, PVM/MA 5, water 900, and sodium orthophenyl phenate 0.5 part.

The whole was stirred until all materials were thoroughly distributed throughout the whole mix and then heated in the course of approximately 3 minutes to a temperature of 190° F. The mixture was maintained at this point until there was no further rapid visible increase in the viscosity of the resulting paste, the heating being continued actually for about 10 minutes.

After being cooled to 125° F., the adhesive was used in laminating high wet strength paper sheets. After the adhered sheets were dried, they were found to be very high in water resistance of the adhesive bond. Thus the two-ply composite of the sheets, after being soaked in water for 24 hours and then tested for failure by being pulled apart, showed failure of the fibers instead of failure of the adhesive bond.

By contrast, an adhesive made similarly but without any PVM/MA showed, in the same final test, failure of adhesive bond rather than the fibers.

EXAMPLE 2

The composition and procedure of Example 1 are used except that the cornstarch is replaced by an equal proportion of any of the other starches disclosed herein, with adjustment of the amount of water to compensate for the viscosity of the starch used.

Tests for Adhesive Strength

The following table shows results of tests where wet strength kraft paper was bonded to itself using as adhesive 10% solutions of each of the adhesive compositions shown. The percentage of the area showing fiber failure, after soaking the bonded paper for 24 hours in water at room temperatures, is shown in the last line. The percentage of fiber failure shows the order of adhesive strength for the various adhesives in the pulling apart test.

| Ingredients Used | Adhesive Compositions | | | | | | | | |
|---|---|---|---|---|---|---|---|---|---|
| | A | B | C | D | E | F | G | H | I |
| Pearl cornstarch | 99.5 | | 50.0 | | 93.6 | | 30.0 | 60.0 | 75.0 |
| Tapioca starch (Brazilian) | | | | 50.0 | | | | | |
| Polyvinyl alcohol (Lemol 65–98) | | 99.5 | 49.5 | 49.5 | | 94.5 | 64.5 | 34.5 | 19.5 |
| PVM/MA (spec. visc. 3.0) | | | | | 6.0 | 5.0 | 5.0 | 5.0 | 5.0 |
| Sodium orthophenyl phenate | 0.5 | 0.5 | 0.5 | 0.5 | 0.4 | 0.5 | 0.5 | 0.5 | 0.5 |
| Percent of fiber failure (wet) | off | 0 | 0 | 0 | 15 | 20 | 30 | 55 | 15 |

In these tests "0" indicates no film failure but bonds required to be pulled apart. "Off" indicates samples floated apart on soaking, showing no water resistance at all in the adhesive film. Lemol 65–98 is a grade of polyvinyl alcohol having a viscosity of 65 cps. in 4% solution at 20° C. and a minimum of 98% of the acetate groups hydrolyzed to alcohol groups. The phenate is used as a starch preservative.

PVM/MA (specific viscosity 0.65) was replaced in certain tests for the PVM/MA of specific viscosity 3.0. The result was satisfactory when the cornstarch and polyvinyl alcohol were also used but there was no failure of fiber in the pulling apart test when the cornstarch was omitted. Also, ammonium sulfate was added in the proportion of 1 part for 100 dry weight of adhesive composition with good results as compared to the closest comparable composition.

EXAMPLE 3

The compositions and procedures of Example 1 or 2 or the compositions tabulated under A–I are used with the exception that there is introduced a powdered extender in amount desired for the end use of the product. Thus there is admixed finely divided clay, diatomaceous earth, calcium carbonate or wood flour in amounts within the range 5–100 parts for 100 parts of the dry weight of the adhesive composition.

I find that clay is a satisfactory and economical extender and I ordinarily use the clay in the proportion of about 10%–60% of the said dry weight of the adhesive composition.

It is to be understood that it is intended to cover all changes and modifications of the examples of the invention herein chosen for the purpose of illustration which do not constitute departures from the spirit and scope of the invention.

I claim:

An adhesive comprising the esterification reaction product of 30 to 75 parts by weight of starch and 4 to 20 parts by weight of a copolymer of vinyl methyl ether and maleic anhydride, and 15 to 60 parts by weight of an admixed polyvinyl alcohol for 100 parts dry weight of the adhesive composition.

References Cited in the file of this patent

UNITED STATES PATENTS

| | | |
|---|---|---|
| 2,487,448 | Kingerley | Nov. 8, 1949 |
| 2,492,203 | Treadway | Dec. 27, 1949 |
| 2,533,635 | Seymour | Dec. 12, 1950 |

FOREIGN PATENTS

| | | |
|---|---|---|
| 703,005 | Great Britain | Jan. 27, 1954 |

UNITED STATES PATENT OFFICE
CERTIFICATE OF CORRECTION

Patent No. 3,133,890

May 19, 1964

Richard K. Britton

It is hereby certified that error appears in the above numbered patent requiring correction and that the said Letters Patent should read as corrected below.

Column 1, line 62, for "of" read -- are --; column 2, line 2, for "of" read -- for --.

Signed and sealed this 20th day of October 1964.

(SEAL)
Attest:

ERNEST W. SWIDER
Attesting Officer

EDWARD J. BRENNER
Commissioner of Patents